United States Patent [19]

Crosby

[11] Patent Number: 5,150,334

[45] Date of Patent: Sep. 22, 1992

[54] SYSTEM AND METHOD FOR ULTRASONIC MEASUREMENT OF MATERIAL LEVEL

[75] Inventor: David J. Crosby, San Jose, Calif.

[73] Assignee: Bindicator Company, Port Huron, Mich.

[21] Appl. No.: 760,619

[22] Filed: Sep. 16, 1991

[51] Int. Cl.$^5$ ............................................... G01S 9/66
[52] U.S. Cl. ........................................ 367/98; 367/99; 367/908; 367/900; 367/902
[58] Field of Search ................ 367/908, 98, 900, 902, 367/99; 73/290 V; 340/621

[56] References Cited

U.S. PATENT DOCUMENTS

| | | | |
|---|---|---|---|
| 4,264,788 | 4/1981 | Keidel et al. | 340/621 |
| 4,427,132 | 1/1984 | Thomson | 73/290 V |
| 4,928,525 | 5/1990 | Aderholt et al. | 367/908 |
| 4,953,141 | 8/1990 | Novak et al. | 367/99 |

Primary Examiner—Daniel T. Pihulic
Attorney, Agent, or Firm—Barnes, Kisselle, Raisch, Choate, Whittemore & Hulbert

[57] ABSTRACT

A system for monitoring level of material in a vessel that includes a transducer for transmitting an ultrasonic signal toward and receiving an echo signal from a surface of the material, and a power switch coupled to the transducer for energizing the transducer to transmit the ultrasonic signal. A microprocessor-based controller has an output coupled to the power switch for controlling operation thereof. The output of the microprocessor provides a pulsed periodic signal to the power switch at controllably variable frequency, duty cycle and/or total burst duration to operate the transducer at an ultrasonic frequency that corresponds to the periodic signal frequency, duty cycle and burst duration. The echo signals are compared to successive thresholds between the transmission bursts, and echo signal data is sampled and stored in the microprocessor over a measurement cycle that includes multiple transmission bursts. The true echo signal from the material surface is distinguished from pulse echo signals as a combined function of amplitude and time duration data so stored.

23 Claims, 3 Drawing Sheets

SYSTEM AND METHOD FOR ULTRASONIC MEASUREMENT OF MATERIAL LEVEL

The present invention relates to distance measuring devices, and more particularly to an ultrasonic system and method for monitoring the level of material in a storage vessel.

BACKGROUND AND OBJECTS OF THE INVENTION

It has heretofore been proposed that ultrasonic measuring techniques be employed for monitoring or measuring the level of material in a storage vessel. As shown in U.S. Pat. No. 4,000,650, for example, an ultrasonic transducer may be mounted at the top of a storage vessel and directed to transmit pulsed energy downwardly toward, and receive echo signals reflected upwardly from, the upper surface of the stored material. The transmitted and echo signals travel through the headspace or air between the transducer at the top of the container and the material surface. Digital electronics are employed to sample the echo signals returned to the transducer, and to distinguish a true echo signal from the surface of the material from false echo signals due to noise, etc. by integrating the echo signals associated with eight successive transmitted pulses so that the sum of the true echo signals returned from the material surface is substantially greater than the sum of random noise signals. Material level is indicated by determining the round-trip transit time of the transmit/echo sequence associated with the true echo signal.

Although the system disclosed in the noted patent addressed a number of problems theretofore extant in the art, further improvements remain desirable. For example, typical prior-art ultrasonic material level measurement systems employ a fixed frequency oscillator that is switched on and off by control circuity for driving the transducer. Oscillator frequency and duty cycle, and usually total burst duration time, are set at the factory and assumed to remain constant. Transducer resonant frequency, for example, may shift with changes in temperature; however, no accommodation is made for changing the frequency of the drive signal. Another problem in typical prior-art devices is associated with gain or amplification applied to the echo signals. Although signal strength is attenuated as a function of the square of the distance traveled through the container headspace, amplification of echo signals is typically held constant. Thus, amplitude of a true echo signal at the processing circuitry from a distant material surface may be substantially less than amplitude of noise signals received earlier in time.

A general object of the present invention is to provide a system and method for ultrasonic measurement of material level that employ state-of-the-art microprocessor-based electronics for enhanced economy of manufacture, as well as improved reliability and versatility in the field. Another object of the present invention is to provide a system and method of the described character in which the level measurement is automatically compensated for variations in temperature in the air through which the signals travel, which affect velocity of the ultrasonic signals through the air, and thereby provide improved resolution and accuracy in the measurement results. Yet another object of the present invention is to provide a system and method of the described character that embody an improved technique for distinguishing true echo signals returned from the material surface from false signals due to dust, noise or other transient occurrences.

SUMMARY OF THE INVENTION

A system for monitoring level of material in accordance with one aspect of the present invention includes a transducer for transmitting an ultrasonic signal toward and receiving an echo signal from a surface of the material, and a power switch coupled to the transducer for energizing the transducer to transmit the ultrasonic signal. A microprocessor-based controller has an output coupled to the power switch for controlling operation thereof. The output of the microprocessor provides a pulsed periodic signal to the power switch at controllably variable frequency, duty cycle and/or total burst duration to operate the transducer at an ultrasonic frequency that corresponds to the periodic signal frequency, duty cycle and duration. In this way, signal frequency, duty cycle and total burst duration are directly controlled by the microprocessor and may be optimized to the operating characteristics of the particular transducer, to the characteristics that yield optimum results at a given temperature or other operating condition, and to a system measurement range selected by the operator. The system and method in accordance with this aspect of the invention thus provides for enhanced versatility and reliability as compared with devices heretofore proposed that embody a fixed frequency oscillator turned on and off by the control electronics.

In accordance with another aspect or feature of the present invention, which may be employed independently of or more preferably in combination with other features of the invention, signal receiving circuitry is coupled to the transducer for feeding the analog echo signals to the microprocessor-based control circuitry. The receiving circuitry has gain characteristics that are controlled by the microprocessor so as to compensate for decreasing amplitude in the echo signals that result from greater distance traveled through the air to and from the material surface. Specifically, the receiver circuitry receives a gain control input for increasing gain of the circuitry with time between pulse transmissions. In the preferred embodiment of the invention, the gain control signal takes the form of a stepped control signal having a level that varies in steps exponentially with time over a total time interval that corresponds to receipt of echo signals between the minimum and maximum material measurement levels selected by the operator. The exponential gain control function may be optimized for each transducer.

Yet another aspect of the present invention, which again may be employed alone or more preferably in combination with one or more of the other aspects of the present invention, contemplates an improved technique for identifying a true or target echo signal returned from the material surface, and distinguishing the same from false echo signals due to noise and other transient conditions. A measurement cycle for the processing circuitry comprises transmission of a plurality of ultrasonic signal bursts toward the material surface, and processing the echo signals received between burst transmissions. The echo signals between successive pairs of transmitted signals are compared to a plurality of differing amplitude thresholds, preferably by comparisons with one specific threshold between successive pairs of burst transmissions. Following transmission of the plurality of signal bursts and storage of echo signal data, the highest amplitude threshold is identified at which echo signals were detected. The times at which these returned signals intersected the lowest amplitude threshold are then identified to obtain an indication of total pulse width. The average amplitude of each return signal that exceeded the higher threshold is then determined, and all echo signals whose amplitudes are at least 50% of the greatest such average amplitude are identified as candidates for the true or target echo signal. The true target signal is then identified as the echo signal within this group having the greatest pulse width, and the round-trip travel time between the transducer and the material surface is determined for this signal.

At the end of each measurement cycle, material level is computed as a function of a running average of current and preceding time measurements. After each measurement cycle, the transit time associated with the true echo signal identified in that cycle is averaged with a preselected number of immediately preceding time measurements to obtain a first raw running average time measurement. A second or refined average is then obtained from a second predetermined number of preceding time measurements, less than the first number, having the least deviation from the first or raw average. This refined average time is then divided by two and multiplied by the velocity of sound in air to obtain a level measurement reading. This feature of the invention helps isolate the material level measurement output from transient variations.

In the preferred embodiment of the invention, a temperature sensor is positioned within the headspace of the storage vessel, by being mounted on the transducer itself, so as to be responsive to temperature variations in the headspace air through which the ultrasonic signals travel. Level of material in the vessel is determined as a combined function of a temperature signal from the sensor, which affects velocity of sound through the headspace air, and round-trip transit time of the transmitted and echo signals. The ultrasonic transducer preferably takes the form of a unitary transducer structure that both transmits and receives the ultrasonic signals, although separate transmitting and receiving transducer elements may be employed without affecting the other aspects of the present invention. The principles of the invention may also be employed in conjunction with systems that transmit pulses upwardly through the material and receive echoes from the material/air interface; however, arrangements of this character are not preferred.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
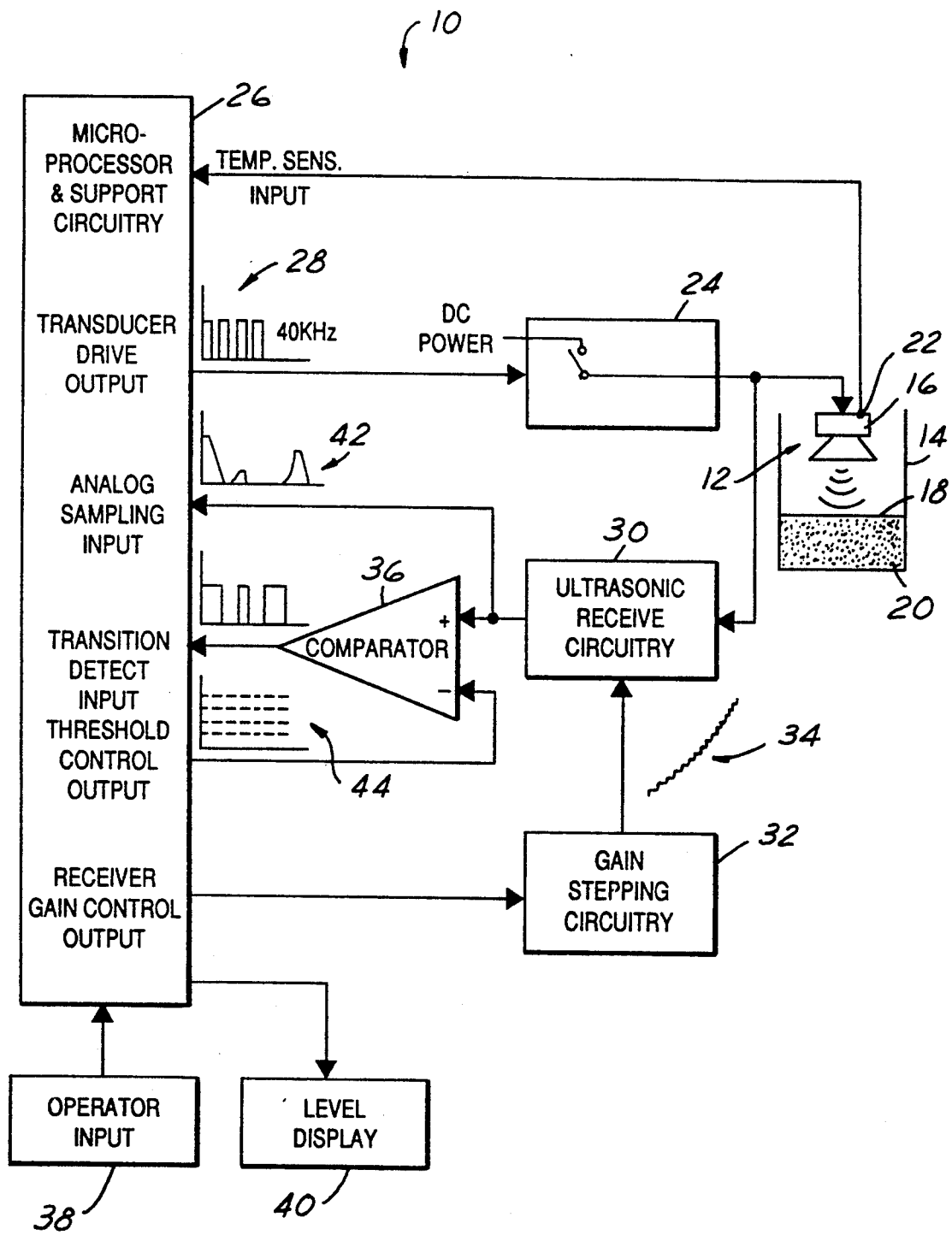
FIG. 1 is a functional block diagram of a system for measuring material level in accordance with a presently preferred embodiment of the invention.

FIG. 1 illustrates a system 10 in accordance with a presently preferred embodiment of the invention as comprising a transducer assembly 12 for mounting at the upper portion of a material storage vessel 14. Assembly 12 includes a piezo-electric transducer 16 for directing pulsed ultrasonic signals downwardly toward, and receiving echo return signals reflected upwardly from, the upper surface 18 of material 20 within vessel 14. In the preferred embodiment of the invention, transducer 16 comprises a single-element transducer as shown in FIG. 1, although transducers embodying separate transmitting and receiving elements may be employed without otherwise affecting the principles of the invention. A temperature sensor 22 is carried by transducer assembly 12 so as to be responsive to the temperature of the headspace air within vessel 14 through which the transmitted and echo ultrasonic signals travel.

D. C. power is selectively applied to transducer 16 by controlled electronic switch 24 coupled to an output port of microprocessor-based control and support circuit 26. Thus, the frequency, duty cycle and total burst duration of the pulsed energy applied by switch 24 to transducer 16 are entirely controlled by the frequency, duty cycle and total burst duration of control pulses applied to switch 24 by control circuit 26. In the graphic illustration 28 (FIG. 1), the pulsed control signal applied to transducer drive switch 24 is at a frequency of 40 KHz, which corresponds to the nominal design resonant frequency of transducer 16, and a duty cycle of approximately 70%. Microprocessor-based control circuit 26 may vary the frequency or duty cycle of signal 28 to obtain optimum response at the transducer for a given temperature, temperature sensor 22 being connected to a corresponding input port of control circuit 26. The number of control pulses applied to switch 24, the overall number of which determines signal burst duration at transducer 16, may likewise be varied to employ shorter bursts, for example, where material level is high and the distance to be measured is therefore relatively short. For example, burst duration may vary between one and twenty cycles as a function of measurement distance. Likewise, the duty cycle of the signal applied to switch 24 may be reduced for short-distance measurements to reduce ringing at the transducer.

Transducer 16 is also connected to the signal input of an ultrasonic receiving circuit 30, which has a gain input controlled by a corresponding output of microprocessor-based controller 26 through a gain stepping circuit 32. Amplitude of sound waves traveling through air is attenuated as a function of the square of the distance through which the sound waves travel. To compensate for this attenuation, the gain (i.e., the amplification capability) of receiver circuit 30 is increased substantially uniformly as a function of time between successive transmission bursts 28. Specifically, a stepped signal 34 is applied to the gain control input of receiving circuit 30 for increasing the circuit gain substantially exponentially in stepped increments. The precise characteristics of signal 34 may be optimized for a given transducer and/or environment by appropriately programming control circuit 26.

The analog output of receiving circuit 30 is fed to an analog input of control circuit 26 at which the incoming signal is subjected to analog-to-digital conversion at uniform sampling intervals, such as 250 microseconds. The analog output of receiving circuit 30 is also fed to one input of a comparator 36, which receives a second or threshold reference input from a threshold control output of control circuit 26. The output of comparator 36, which is a digital signal that is at a high or logical one level when the analog input from receiving circuit 30 exceeds the threshold input from controller 26 and at a low or logical zero level when the analog input is less than the threshold input, is fed to a corresponding input port of controller 26. Microprocessor-based controller 26 also receives input information from an operator panel 38 or the like, and provides a level-indicating output to a display 40, which preferably comprises a digital display located onboard and/or remotely of the system electronics package.

Figure 2:
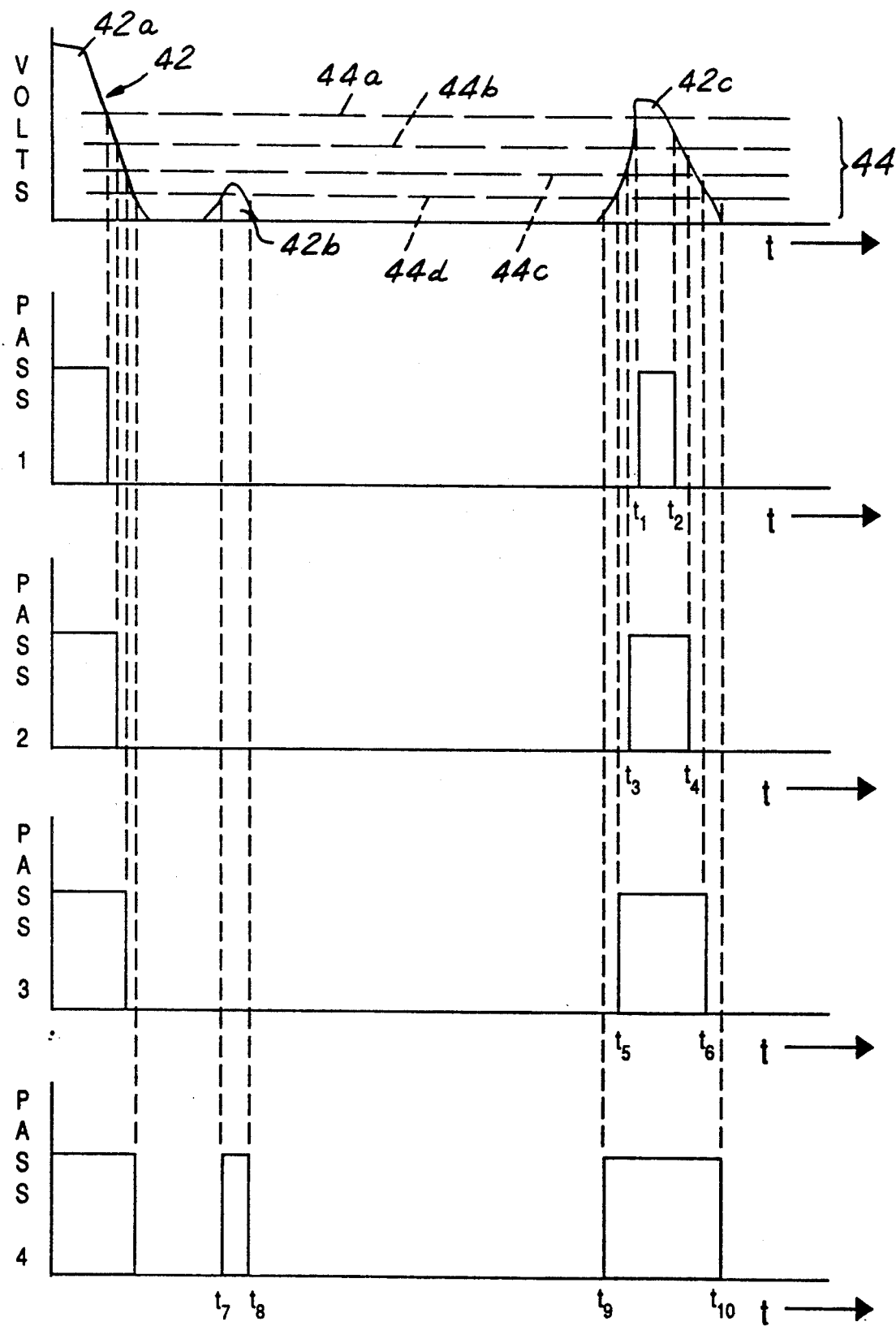
FIG. 2 is a timing diagram useful in describing operation of the invention as illustrated in FIG. 1.
Figure 3:
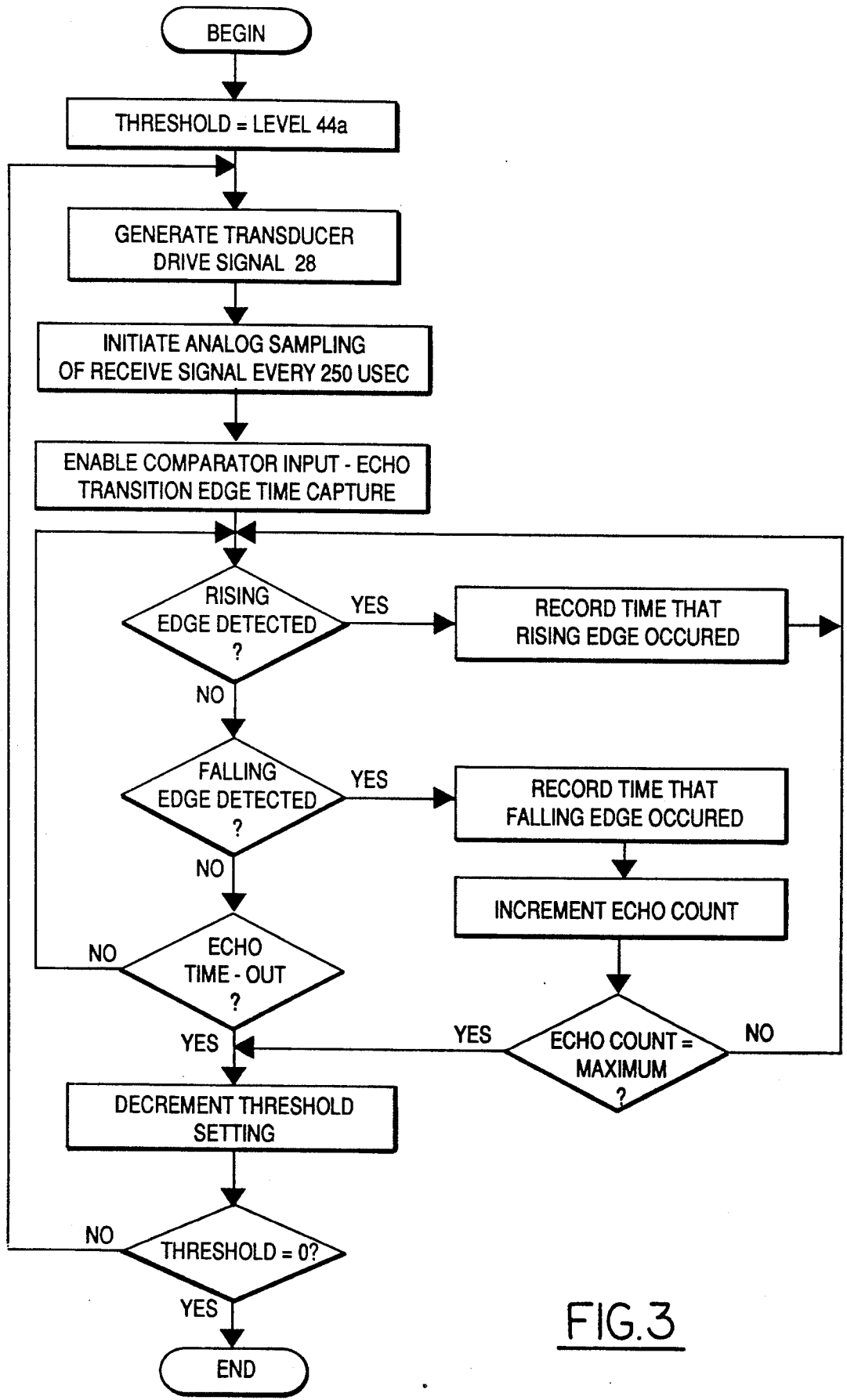
FIG. 3 is a flow chart that illustrates setting of the echo signal detection thresholds in accordance with the preferred embodiment of the invention.

Operation of comparator 36 (FIG. 1) and associated inputs and outputs is illustrated in FIGS. 2 and 3. Signal 42 (FIGS. 1 and 2) is illustrative of the analog output of ultrasonic receiving circuit 30 between a successive pair of transmission bursts 28, including an initial portion 42a of decreasing amplitude representative of the end of the transducer drive signal, a pulse 42b representative of a false echo signal, and a pulse 42c representative of the true echo signal returned to the transducer from the material surface. (It is assumed for purposes of this discussion that the same signal 42 is received between each successive pair of transmission bursts in the four-burst sequence that forms a measurement cycle.) Signal 44 (FIGS. 1 and 2) is representative of the four threshold voltage levels applied to the reference input of comparator 36 in sequence between successive transmission bursts of a measurement cycle. That is, a high threshold voltage level 44a is applied to the reference input of comparator 36 between the first and second transmission bursts 28 of a measurement cycle, an intermediate threshold 44b between the second and third transmission bursts, a lower intermediate level 44c between the third and fourth bursts, and a lowest level 44d after the fourth burst.

On the first pass of a measurement sequence (i.e., after the first transmission burst), the threshold level is set at the highest level 44a. At this threshold level, pulse 42b is ignored because the amplitude thereof fails to cross the detection threshold, and pulse 42c produces a comparator output signal having leading and trailing edges at times t1 and t2. After the time for awaiting the echo signal has timed out (FIG. 3, determined by the maximum measurement height set at operator input 38 in FIG. 1), the threshold level is decremented to the level 42b and operation returns in FIG. 3 to generation of the next transducer drive burst signal 28 (FIG. 1). Again, false echo signal 42b is missed in this second measurement pass, and pulse 42c is detected at times t3 and t4 (FIG. 2). The threshold setting is again decremented, this time to level 44c, and the next transducer drive signal is generated. Pulse 42b is again missed on the third pass, and pulse 42c is detected at times t5 and t6 (FIG. 2). The threshold is then decremented to the lowest threshold setting 44d, and a fourth transducer drive signal 28 is generated. In this pass, the false echo signal 42b is detected to produce a comparator output having leading and trailing edges at times t7 and t8 in FIG. 2, and the true echo signal 42c produces a comparator output having leading and trailing edges at times t9 and t10. The threshold setting again is decremented, this time reaching the zero level and indicating the end of a four-pulse measurement sequence in FIG. 3. It should also be noted in FIG. 3 that provision is made for a maximum number of echo signals for any given transducer drive signal. This allows efficient operation of the echo receiving circuitry. For example, a maximum of four echo signals may be processed per transmitted burst.

After the analog and digital signal data illustrated in FIG. 2 has been sampled and stored in microprocessor-based control circuit 26 for each of the four passes at different threshold settings per the flow chart of FIG. 3, microprocessor-based control circuit 26 then functions to correlate the collected data and determine the time at which the true target echo was received. In general, this is accomplished in two stages: a first for distinguishing the true echo signal from the material surface from any false echo signals, and a second for processing the round-trip transit time of the true echo signal so identified to provide a level measurement indication. In the first processing stage, the highest threshold setting is identified at which one or more echo signals were detected. In the example of FIG. 2, this occurred at times t1,t2 at threshold setting 44a. For each such transition, the corresponding echo transition times at the lowest threshold level 44d are then determined—i.e., times t9 and t10 in FIG. 2—to obtain the total pulse width of the signal at the detection circuitry—i.e., time t10 minus t9 in FIG. 2.

As a next step, the maximum amplitude is determined for each return signal that exceeded this highest threshold, signal pulse 42c in the example of FIG. 2. The echo signal having the largest such amplitude is then identified, and all echo signals that have amplitudes equal to at least 50% of such maximum average amplitude are then identified as candidates for the target echo signal. Among these candidates, the true target signal is identified as the echo signal having the greatest pulse width. If multiple pulses have the same or similar pulse width, the earliest among these is identified as the true echo signal. To complete the first stage of this echo processing technique, the time associated with transition of the true echo signal so identified through the lowest threshold level 44d is then identified as being indicative of the round-trip transit time from the transducer to the material surface and back—i.e., time t9 in FIG. 2.

In the second stage of echo signal processing, the round-trip transit time associated with the true echo signal so obtained is then averaged with echo signal times from preceding measurement cycles to smooth out or filter the resulting level measurement against transient variations. Specifically, this averaging operation is accomplished by loading each transit time in turn into an averaging buffer within microprocessor-based controller 26, which holds up to a first preselected number of transit times. A first or raw average of all non-zero times in this buffer is then calculated following each four-pulse measurement sequence and generation of a corresponding new transit time. Each transit time in the buffer is then compared to the raw average so computed, and a second preselected number of stored transit times (less than the first number), having the smallest or least deviation from the raw average, are then averaged for obtaining a filtered echo transit time. The distance from the transducer to the material surface through the container headspace is then calculated by multiplying the filtered round-trip transit time by the temperature-compensated speed of sound and dividing by two, and level of material within the container is then obtained by subtracting this headspace measurement from total container height. Material level is indicated at display 40 and/or employed for control purposes.

I claim:

1. A system for monitoring level of material that comprises:

transducer means for transmitting ultrasonic signals toward and receiving an echo signals from a surface of the material, switch means for selectively connecting and disconnecting said transducer means to and from a source of electrical power for energizing and de-energizing said transducer means, and microprocessor-based control means having an output coupled to said switch means for controlling operation thereof, said output providing a pulsed periodic signal at variable frequency, duty cycle and total time duration to operate said switch means at an ultrasonic frequency that corresponds to said periodic signal frequency, at a duty cycle that corresponds to said periodic signal duty cycle and/or a time duration that corresponds to said periodic signal time duration, said control means including means for discriminating between false echo signals and true echo signals from the material surface comprising means operatively coupled to said transducer means for sampling and storing said echo signals, means for identifying an echo signal having greatest amplitude, means for examining duration of all echo signals having an amplitude at least equal to a predetermined percentage of said greatest amplitude, and means for identifying a said true echo signal as the echo signal among those so examined having greatest time duration.

2. The system set forth in claim 1 further comprising receiver circuit means coupled to said transducer means for receiving signals from said transducer means corresponding to echo signals from the material surface and providing said signals to said microprocessor-based control means, said receiver circuit means having an input for controlling gain of said receiver circuit means, and means coupled to said input and responsive to said control means for increasing gain of said receiver circuit means with time between each burst transmission at said transducer means.

3. The system set forth in claim 2 wherein said gain-increasing means is responsive to said control means for increasing gain of said receiver circuit means substantially exponentially between said burst transmissions.

4. The system set forth in claim 3 further comprising means coupled to said control means for determining system range between minimum and maximum material levels, said gain-increasing means being responsive to said control circuit means for increasing gain of said receiver circuit means in a predetermined number of discrete steps over a total time duration that corresponds to said minimum and maximum material levels.

5. The system set forth in claim 1 further comprising mean for feeding signals corresponding to said echo signals from said transducer means to said control means, and temperature sensing means positioned to be responsive to temperature of air between said transducer means and the material level for developing a temperature signal; and wherein said control means includes means for determining level of material with respect to said transducer means as a combined function of said temperature signal and time between said ultrasonic and echo signals at said transducer means.

6. The system set forth in claim 1 wherein said control means includes means for determining material level as a function of time between said ultrasonic and echo signals said level-determining means including means for accumulating and storing a plurality of time signals corresponding to times between successive ultrasonic and echo signals, and means for determining material level as a function of a running average of said time signals.

7. A system for monitoring level of material that comprises:

transducer means for transmitting ultrasonic signals toward and receiving echo signals from a surface of the material, switch means for selectively connecting and disconnecting said transducer means to and from a source of electrical power for energizing and de-energizing said transducer means, microprocessor-based control means having an output coupled to said switch means for controlling operation thereof, said output providing a pulsed periodic signal at variable frequency, duty cycle and total time duration to operate said switch means at an ultrasonic frequency that corresponds to said periodic signal frequency, at a duty cycle that corresponds to said periodic signal duty cycle and/or a time duration that corresponds to said periodic signal time duration, receiver circuit means coupled to said transducer means for receiving signals from said transducer means corresponding to echo signals from the material surface and providing said signals to said microprocessor-based control means, said receiver circuit means having an input for controlling gain of said receiver circuit means, and means coupled to said input and responsive to said control means for increasing gain of said receiver circuit means with time between each burst transmission at said transducer means, and means coupled to said control means for determining system range between minimum and maximum material levels, said gain-increasing means being responsive to said control means for increasing gain of said receiver circuit means in a predetermined number of discrete steps over a total time duration that corresponds to said minimum and maximum material levels.

8. The system set forth in claim 1 wherein said means for identifying said echo signal of greatest amplitude comprises means for comparing amplitude of each said echo signal to a plurality of differing amplitude thresholds and means for determining the echo signal whose amplitude exceeds a greater threshold than other of said echo signals.

9. The system set forth in claim 8 wherein said threshold-comparing means comprises means for comparing said echo signals to successive thresholds in turn between respective sequential pairs of said ultrasonic signals.

10. A method of determining level of material as a function of round-trip transit time of ultrasonic signals between a transducer and a surface of the material comprising the steps of:

(a) transmitting a series of ultrasonic signals toward the material surface, (b) monitoring for echo signals from the material surface between each ultrasonic signal transmitted in said step (a), (c) comparing amplitude of the echo signals to a plurality of differing amplitude thresholds, and (d) distinguishing between a true echo signal from the material surface and false echo signals as a function of echo signals whose amplitudes exceed a higher threshold than other of said echo signals.

11. The method set forth in claim 10 wherein step (c) is carried out by (c1) comparing said echo signals to a preset threshold between each pair of successive ultrasonic signals, and (c2) varying said threshold between successive pairs of said ultrasonic signals.

12. The method set forth in claim 10 comprising the additional steps of:

(e) measuring time duration during which each echo signal exceeds each said threshold, and (f) distinguishing said true echo signal in said step (d) as a combined function of said time durations measured in said step (e) and said threshold comparison in said step (c).

13. The method set forth in claim 12 wherein said step (f) comprises the step of identifying said true echo signal as the echo signal whose amplitude exceeds one of said thresholds for the greatest time duration.

14. The method set forth in claim 13 wherein said step (f) comprises the steps of:

(f1) identifying a said echo signal having greatest amplitude, (f2) examining time duration of all echo signals having an amplitude at least equal to a predetermined percentage of said maximum amplitude, and (f3) identifying said true echo signal as the echo signal among those examined in said step (f2) having greatest time duration.

15. The system set forth in claim 7 wherein said control means includes means for discriminating between false echo signals and true echo signals from the material surface comprising means for sampling and storing said echo signals, means for identifying an echo signal having greatest amplitude, means for examining duration of all echo signals having an amplitude at least equal to a predetermined percentage of said greatest amplitude, and means for identifying said true echo signal as the echo signal among those so examined having greatest time duration.

16. A system for monitoring level of material that comprises:

transducer means for transmitting ultrasonic signals toward and receiving echo signals from a surface of the material, microprocessor-based control means including means coupled to said transducer means for controlling operation thereof, receiver circuit means coupled to said transducer means for receiving signals from said transducer means corresponding to echo signals from the material surface and providing said signals to said microprocessor-based control means, said receiver circuit means having an input for controlling gain of said receiver circuit means, and means coupled to said input and responsive to said control means for increasing gain of said receiver circuit means with time between each burst transmission at said transducer means, and means coupled to said control means for determining system range between minimum and maximum material levels, said gain-increasing means being responsive to said control circuit means for increasing gain of said receiver circuit means in a predetermined number of discrete steps over a total time duration that corresponds to said minimum and maximum material levels.

17. The system set forth in claim 16 wherein said gain-increasing means is responsive to said control means for increasing gain of said receiver circuit means substantially exponentially between said burst transmission.

18. A system for monitoring level of material that comprises:

transducer means for transmitting a series of ultrasonic signals toward a surface of the material and receiving echo signals in response to each said ultrasonic signal, means coupled to said transducer means for comparing amplitude of said echo signals to a plurality of amplitude thresholds, means for distinguishing a true echo signal from the material surface from false echo signals as a function of echo signals whose amplitude exceed said thresholds, and means for determining the level of said material surface as a function of round-trip transit time of said time signal from and to said transducer means.

19. The system set forth in claim 18 wherein said signal-distinguishing means includes means for determining time durations during which said echo signals exceed at least some of said thresholds, and means for identifying said true echo signal as a combined function of said time durations and said echo signal amplitudes.

20. The system set forth in claim 19 wherein said comparing means comprises means for comparing said echo signals to differing said thresholds between each of said ultrasonic signals.

21. A system for monitoring level of material that comprises:

transducer means for transmitting ultrasonic signals toward and receiving echo signals from a surface of the material, microprocessor-based control means including means coupled to said transducer means for controlling operation thereof and receiving said echo signals, and means for discriminating between false echo signals and true echo signals from the material surface comprising means for sampling and storing said echo signals, means for identifying an echo signal having greatest amplitude, means for examining duration of all echo signals having am amplitude at least equal to a predetermined percentage of said greatest amplitude, and means for identifying a said true echo signal as the echo signal among those so examined having greatest time duration.

22. The system set forth in claim 21 wherein said means for identifying said echo signal of greatest amplitude comprises means for comparing amplitude of each said echo signal to a plurality of differing amplitude thresholds and means for determining the echo signal whose amplitude exceeds as greater threshold than other of said echo signals.

23. The system set forth in claim 22 wherein said threshold-comparing means comprises means for comparing said echo signals to successive thresholds in turn between respective sequential pairs of said ultrasonic signals.

* * * * *